(12) United States Patent
Okuno et al.

(10) Patent No.: US 8,333,176 B2
(45) Date of Patent: Dec. 18, 2012

(54) CONNECTOR

(75) Inventors: Yoshinori Okuno, Kariya (JP); Jun Kondo, Nagoya (JP)

(73) Assignee: Denso Corporation, Kariya (JP)

( * ) Notice: Subject to any disclaimer, the term of this patent is extended or adjusted under 35 U.S.C. 154(b) by 498 days.

(21) Appl. No.: 12/750,063

(22) Filed: Mar. 30, 2010

(65) Prior Publication Data

US 2010/0242918 A1   Sep. 30, 2010

(30) Foreign Application Priority Data

Mar. 31, 2009  (JP) .................................... 2009-85946

(51) Int. Cl.
*F02M 55/02*   (2006.01)
*F16L 25/00*   (2006.01)
(52) U.S. Cl. .......................... 123/468; 285/332; 285/918
(58) Field of Classification Search ................... 123/468, 123/467, 456; 285/133.21, 330, 332, 334.2, 285/334.3, 918
See application file for complete search history.

(56) References Cited

U.S. PATENT DOCUMENTS

| | | | | |
|---|---|---|---|---|
| 3,689,111 A | * | 9/1972 | Osmun et al. ................... | 285/39 |
| 4,844,515 A | * | 7/1989 | Field ............................ | 285/305 |
| 5,046,765 A | * | 9/1991 | Usui ............................ | 285/197 |
| 5,096,232 A | * | 3/1992 | Fond et al. ...................... | 285/55 |
| 5,110,160 A | * | 5/1992 | Brozovic ....................... | 285/211 |
| 6,045,166 A | * | 4/2000 | Krause .......................... | 285/347 |
| 6,073,976 A | * | 6/2000 | Schmidt et al. ................. | 285/341 |
| 6,447,028 B1 | * | 9/2002 | LaMarca et al. ............... | 285/404 |
| 6,523,863 B2 | * | 2/2003 | Ishiwata ........................ | 285/316 |
| 6,578,877 B1 | * | 6/2003 | Sundholm ..................... | 285/197 |
| 7,070,208 B2 | * | 7/2006 | Richey et al. .................. | 285/220 |
| 7,195,283 B2 | * | 3/2007 | Chisnell ........................ | 285/208 |
| 7,419,189 B2 | * | 9/2008 | Dickerson et al. .............. | 285/89 |
| 2007/0252384 A1 | * | 11/2007 | Dickerson et al. .............. | 285/89 |
| 2007/0272314 A1 | * | 11/2007 | Packham ................. | 137/614.03 |
| 2010/0084859 A1 | * | 4/2010 | Kirkman ....................... | 285/232 |
| 2011/0215568 A1 | * | 9/2011 | Webb ............................ | 285/330 |

FOREIGN PATENT DOCUMENTS

| | | |
|---|---|---|
| JP | 11-013974 | 1/1999 |
| JP | 2001-090880 | 4/2001 |
| JP | 2003-343785 | 12/2003 |

(Continued)

OTHER PUBLICATIONS

U.S. Appl. No. 12/750,150 of Okuno et al., filed Mar. 30, 2010.

(Continued)

*Primary Examiner* — Thomas Moulis
(74) *Attorney, Agent, or Firm* — Nixon & Vanderhye PC

(57) ABSTRACT

A connector includes a body portion having an inner peripheral surface defining a cylindrical insertion hole for inserting therein a connection member and an O-ring. A recess portion is provided in the inner peripheral surface of the body portion, and is opened in the body portion in a radial direction of the body portion, at a position on an inlet side of the insertion hole than the arrangement position of the O-ring. Furthermore, the recess portion extends in an axial direction of the body portion and has an end portion on a side of an arrangement position of the O-ring, and the end portion of the recess portion becomes in an acute angle shape which is acute toward the arrangement position of the O-ring. Alternatively, an angle reducing portion may be provided in the recess portion on a side of the arrangement position of the O-ring.

8 Claims, 6 Drawing Sheets

FOREIGN PATENT DOCUMENTS

JP    2009-197912    9/2009

OTHER PUBLICATIONS

U.S. Appl. No. 12/750,087 of Okuno et al., filed Mar. 30, 2010.
U.S. Appl. No. 12/750,117 of Okuno et al., filed Mar. 30, 2010.
An Extraction from NOK Corporation's Homepage Searched on Mar. 1, 2009, "B-I Regarding Chamfering of Hole Portion and Shaft Portion", www.nok.co.jp/seihin/O-rings_pdf/bij.pdf.
Japanese Office Action dated Jan. 25, 2011, issued in Japanese Application No. 2009-085946 with English Translation.
Chinese Office Action dated Oct. 19, 2011, issued in corresponding Chinese Application No. 201010154315.3 with English Translation.

* cited by examiner

CONNECTOR

CROSS REFERENCE TO RELATED APPLICATION

This application is based on Japanese Patent Application No. 2009-085946 filed on Mar. 31, 2009, the contents of which are incorporated herein by reference in its entirety.

FIELD OF THE INVENTION

The present invention relates to a connector into which a connection member for a fluid flow is inserted and connected.

BACKGROUND OF THE INVENTION

In a conventional connector described in JP 2003-343785A, a cylindrical connection member, in which a fluid flows, is inserted into a cylindrical insertion hole provided in a connector. Furthermore, an O-ring is inserted between the connector and the connection member so as to secure sealing performance therebetween.

In the connector described in JP 2003-343785A, a protrusion portion provided on an outer peripheral surface of the connection member is engaged with a recess portion provided on an inner peripheral surface of an insertion hole of the connector, thereby preventing the connection member from being removed from the connector. The recess portion of the connector is arranged at an inlet side of the insertion hole from an arrangement position where the O-ring is arranged. Thus, the O-ring passes the recess portion of the connector when being inserted into the insertion hole of the connector. Accordingly, while the O-ring passes the recess portion, the O-ring may be scratched by the recess portion, and may be damaged.

On the other hand, the home page of NOK corporation, searched on Mar. 1, 2009 from the Internet online (URL: http://www.nok.co.jp/seihin/O-rings pdf/bij.pdf), is described regarding an O-ring technical note. The O-ring technical note describes that, it is prefer to chamfer a hole portion in order to prevent a damage of an O-ring, if the O-ring is required to pass the hole portion when a connection member is connected to a connector.

SUMMARY OF THE INVENTION

The inventors of the present application studied regarding an example shown in FIG. 8, in which the art published in the above internet is adapted to the connector described in JP 2003-343785A. As shown in FIG. 8, a chamfer portion 50b is provided in a recess portion 50a of the connector 50. Therefore, even if an O-ring 52 passes the recess portion 50a while a connection member 51 is inserted into an insertion hole 50c of the connector 50, it can restrict the O-ring 52 from being scratched by the recess portion 50a, thereby preventing the O-ring 52 from being damaged.

However, in the example of FIG. 8, if the connector 50 is molded integrally, the chamfer portion 50b will be in an undercut shape, and it is impossible to remove the molded product as the connector 50 from a molding die.

Because the recess portion 50a is provided to be recessed from an inner peripheral surface of the connector 50 defining the insertion hole 50c, it is difficult to mold integrally the connector 50.

In view of the foregoing problems, it is an object of the present invention to provide a connector and a connector structure, which can prevent a scratch of an O-ring to be inserted into the connector.

According to an aspect of the present invention, a connector is to be connected to a connection member in which a fluid flows, and is to be sealed by using an O-ring between the connector and a cylindrical outer peripheral surface of the connection member. The connector includes a body portion having an inner peripheral surface defining a cylindrical insertion hole for inserting therein the connection member and the O-ring, and a recess portion provided in the inner peripheral surface of the body portion and opened in the body portion in a radial direction of the body portion, at a position on an inlet side of the insertion hole than an arrangement position of the O-ring. Furthermore, the recess portion extends in an axial direction of the body portion and has an end portion on a side of the arrangement position of the O-ring, and the end portion of the recess portion becomes in an acute angle shape which is acute toward the arrangement position of the O-ring. Therefore, a width dimension of the recess portion in a circumferential direction is gradually reduced toward the arrangement position of the O-ring. Thus, when the O-ring is inserted into the insertion hole and passes the recess portion, the O-ring can be gradually removed from the recess portion even when a part of the O-ring is inserted into the recess portion. As a result, it can prevent a scratch of the O-ring due to the recess portion.

In the present invention, the acute angle shape includes not only a strict angle shape but also include an approximately acute angle shape with a slight round generated in molding.

For example, the recess portion may be a polyangular shape having plural tops. In this case, the end portion of the recess portion is one of the tops in the polyangular shape.

According to another aspect of the present invention, a connector is to be connected to a connection member in which a fluid flows, and is to be sealed by using an O-ring between the connector and a cylindrical outer peripheral surface of the connection member. The connector includes a body portion having an inner peripheral surface defining a cylindrical insertion hole for inserting therein the connection member and the O-ring, and a recess portion provided in the inner peripheral surface of the body portion and opened in the body portion in a radial direction of the body portion, at a position on an inlet side of the insertion hole than the arrangement position of the O-ring. Furthermore, an angle reducing portion, in which an angle of the recess portion is reduced, is provided at an end portion of the recess portion on a side of the arrangement position of the O-ring, and the insertion hole is enlarged at an inlet side of the recess portion more than a radial outer dimension of the angle reducing portion.

Because the angle reducing portion is provided, it can prevent a scratch of the O-ring. Furthermore, because the insertion hole is enlarged at an inlet side of the recess portion more than a radial outer dimension of the angle reducing portion, a die for molding the angle reducing portion can be removed from the inlet side of the insertion hole.

For example, the inner peripheral surface of the body portion may have a taper portion in which the diameter of the insertion hole is enlarged as toward the inlet side of the insertion hole, and the recess portion may be provided in the taper portion.

The above connector can be adapted for connecting the connection member for discharging a low pressure fuel from an injector for a fuel injection, to a low pressure fuel pipe.

According to another aspect of the present invention, a connector structure includes a connector that includes a body portion having an inner peripheral surface defining a cylindrical insertion hole extending in an axial direction, a connection member inserted into the insertion hole, an O-ring arranged between the inner peripheral surface of the body portion and a cylindrical outer peripheral surface of the connection member at an O-ring arrangement position in the insertion hole, and a recess portion provided in the inner peripheral surface of the body portion and opened in the body portion in a radial direction of the body portion, at a position on an inlet side of the insertion hole than the O-ring arrangement position. In addition, the recess portion extends in an axial direction of the body portion and has an end portion on a side of the O-ring arrangement position, and the end portion of the recess portion becomes in an acute angle shape which is acute toward the O-ring arrangement position. Therefore, a width dimension of the recess portion in a circumferential direction is gradually reduced toward the arrangement position of the O-ring. Thus, when the O-ring is inserted into the insertion hole and passes the recess portion, the O-ring can be gradually removed from the recess portion even when a part of the O-ring is inserted into the recess portion. As a result, it can prevent a scratch of the O-ring due to the recess portion.

The connector structure may further includes an O-ring holding member for holding the O-ring, and the O-ring holding member may include a protrusion portion that is engaged with the recess portion. In this case, by using the engagement of the protrusion portion of the O-ring holding member with the recess portion, the O-ring can be tightly held in the insertion hole.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

Figure 1:
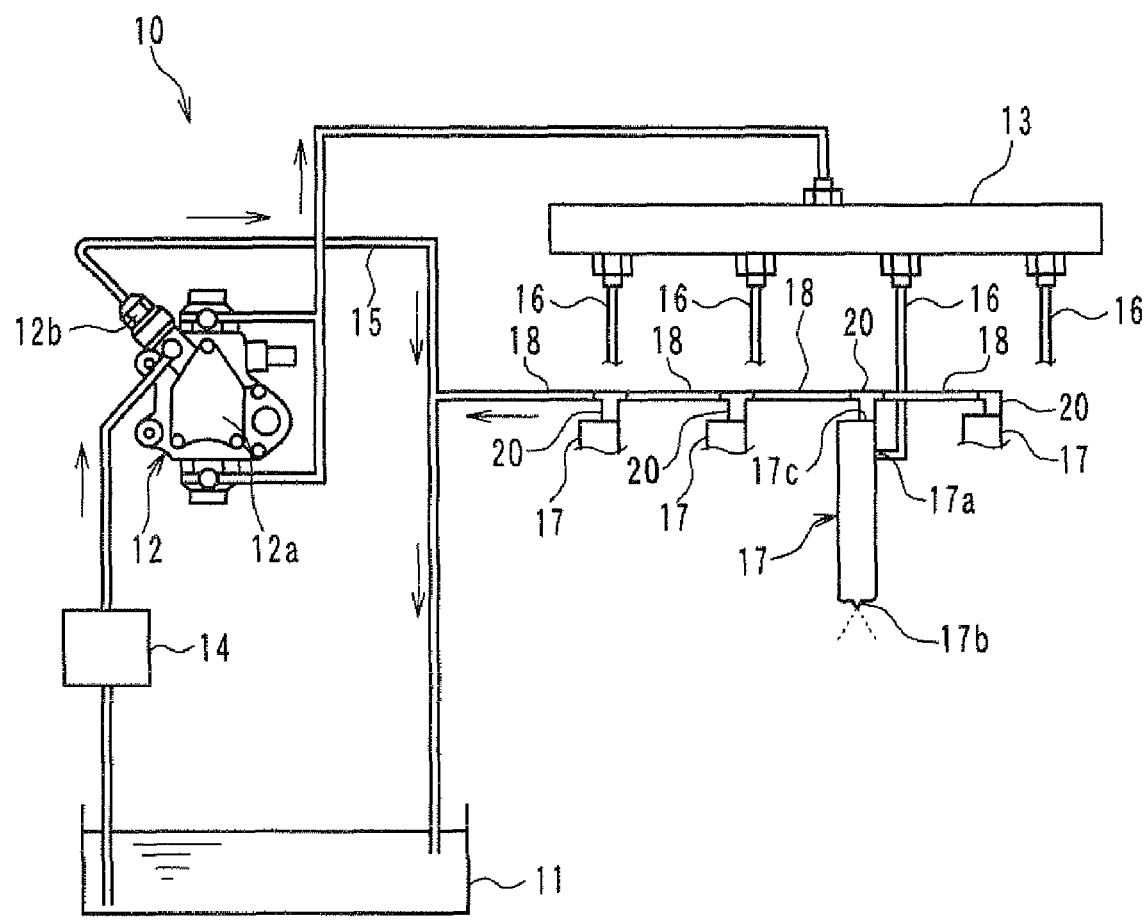
FIG. 1 is a schematic diagram of a fuel injection device according to a first embodiment of the invention.

A first embodiment of the present invention will be now described with reference to FIGS. 1 to 6B. FIG. 1 is a schematic diagram showing a fuel injection device 10 that is typically used for a diesel engine in the present embodiment. The fuel injection device 10 is configured to inject fuel (fluid) stored in a fuel tank 11 into respective cylinders of an internal combustion engine. As the fuel, a diesel oil or a bio-fuel or the like may be used. The bio-fuel may include an alcohol fuel made of a vegetal material, and the like. The fuel in the fuel tank 11 is supplied to a common rail 13 by a fuel supply pump 12. A fuel filter 14 is located between the fuel tank 11 and the fuel supply pump 12.

The fuel supply pump 12 includes a feed pump portion (not shown), and a high-pressure pump portion 12a. The feed pump portion is adapted to draw fuel from the fuel tank 11 and to supply the drawn fuel to the high-pressure pump portion 12a. The high-pressure pump portion 12a pressurizes the fuel supplied from the feed pump portion, and send the pressurized fuel to a common rail 13. The feed pump portion and the high-pressure pump portion 12a may be driven by an internal combustion engine or an electrical pump.

The high-pressure pump portion 12a is provided with a pressure adjustment valve 12b (overflow adjustment valve) which causes the fuel in the fuel tank 11 to flow out when a pressure in the pump 12 is more than a predetermined pressure. The fuel adjustment valve 12b is connected to the fuel tank 11 via a fuel return pipe 15.

The common rail 13 is configured as an accumulator in which the fuel pressurized in the high-pressure pump portion 12a can be maintained at a high pressure, and is connected to a fuel introduction port 17a of an injector 17 via a high-pressure fuel pipe 16. Generally, a plurality of the injectors 17 (e.g., four) and high-pressure fuel pipes 16 are provided to correspond to the plural cylinders of the internal combustion engine, respectively.

The high-pressure fuel accommodated in the common rail 13 is supplied to the injectors 17 via the high-pressure fuel pipes 16, and is injected into respective cylinders of the internal combustion engine via injection holes 17b of the injectors 17. Each of the injectors 17 is controlled by a controller to be opened for a predetermined time at a predetermined timing.

The injector 17 is provided with a fuel flow-out port 17c from which overflow fuel (i.e., leak fuel) flows out. The fuel overflowing from the injector 17 is, for example, a surplus fuel which is not injected from the injector 17 in the fuel supplied from the common rail 13 to the injector 17, or a fuel discharged from a control chamber 175a inside of the injector 17 shown in FIG. 2.

A low pressure fuel pipe 18 is connected to the respective fuel flow-out ports 17c. The leak fuel flowing out from the fuel flow-out port 17c to the low pressure fuel pipe 18 is returned to the fuel tank 11 together with the fuel flowing through the fuel return pipe 15. A connector 20 is located at each connection portion between the fuel flow-out port 17c and the low pressure fuel pipe 18.

Figure 2:
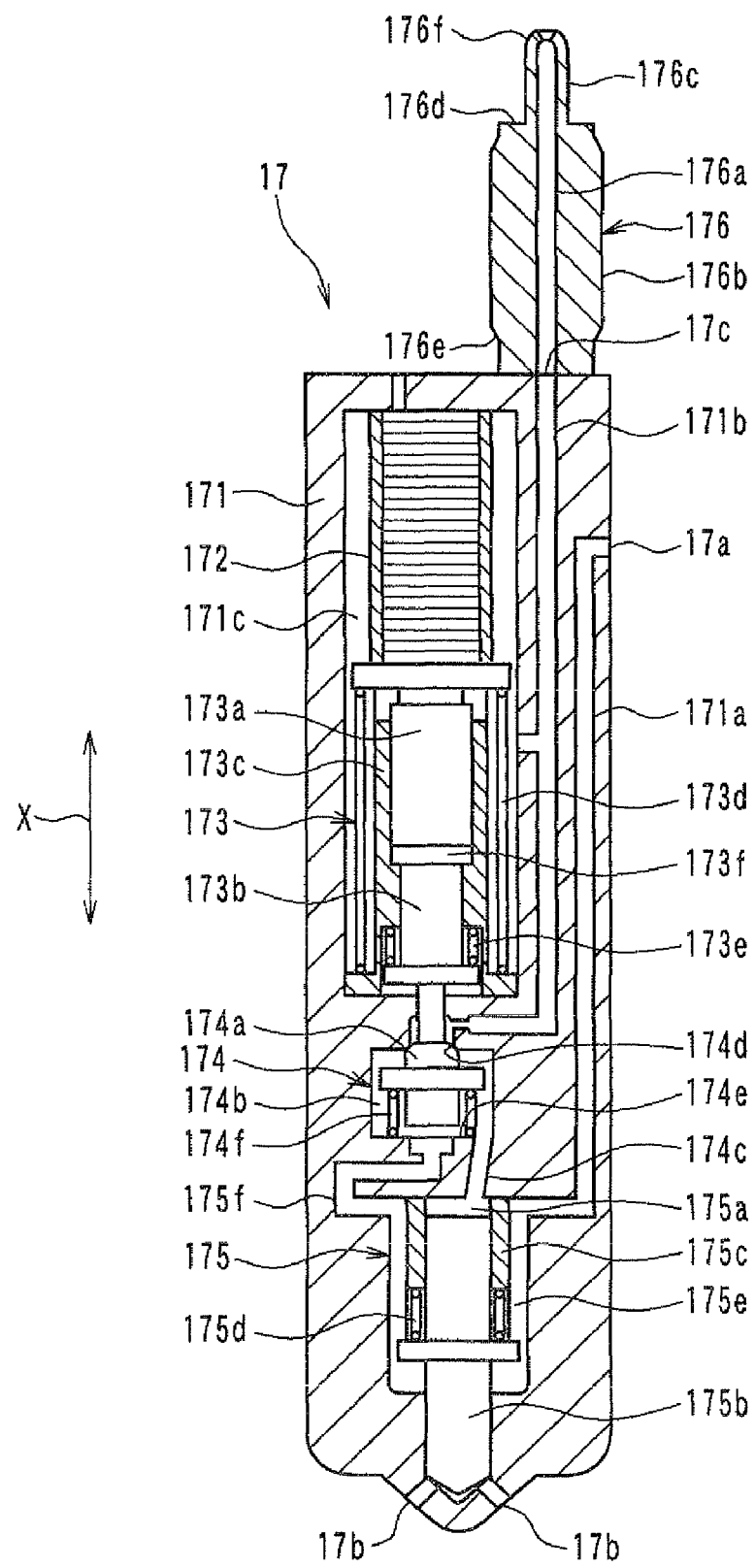
FIG. 2 is a schematic cross-sectional view showing an injector in the fuel injection device of FIG. 1.

FIG. 2 is a cross-sectional view showing one example of the injector 17. The injector 17 includes a piezo actuator 172, a drive power transmission portion 173, a control valve portion 174 and a nozzle portion 175, which are accommodated inside of an approximately cylindrical injector body 171. The piezo actuator 172, the drive power transmission portion 173, the control valve portion 174 and the nozzle portion 175 are arranged in this order in an axial direction X of the injector body 171, as shown in FIG. 2.

The fuel introduction port 17a for introducing high-pressure fuel from the common rail 13 is opened at a side wall of the injector body 171. The injection ports 17b for injecting high-pressure fuel are opened at a tip end portion of the injector body 171 on a side of the nozzle portion 175 (e.g., a lower end side of FIG. 2).

The fuel flow-out port 17c for flowing out of the leak fuel is provided at an end surface of the injector body 171 on a side of the piezo actuator 172 (e.g., an upper side of FIG. 2). The connector 20 and a connection member 176 are disposed at a position of the injector body 171, where the fuel flow-out portion 17c is provided.

A high pressure passage 171a is provided in the injector body 171 to communicate with the fuel introduction port 17a. The high pressure passage 171a is provided in the injector body 171 to extend in the axial direction X. A low pressure passage 171b is provided in the injector body 171 to communicate with the fuel flow-out portion 17c, and extends in parallel with the high pressure passage 171a in the axial direction X.

A receiving space 171c, in which the piezo actuator 172 and the drive power transmission portion 173 are received, is provided in the injector body 171. The low pressure passage 171b is provided in the injector body 171 to communicate with the receiving space 171c. The piezo actuator 172 is actuated by a drive circuit (not shown), and is configured to extend or contract in the axial direction X.

The drive power transmission portion 173 includes first and second pistons 173a, 173b movable integrally with the piezo actuator 172, a cylindrical member 173c which slidably hold the first and second pistons 173a, 173b, a first spring 173d which causes the first piston 173a to be biased toward the piezo actuator 172 so as to contact the piezo actuator 172, and a second spring 173e which causes the second piston 173b to be biased toward the control valve 174a of the control valve portion 174. An oil chamber 173f, in which an operation oil (e.g., fuel in the present embodiment) is filled, is provided between the first and second pistons 173a, 173b.

The control valve portion 174 includes a control valve 174a configured as a three-way valve, which is accommodated in a valve chamber 174b. The valve chamber 174b is made to generally communicate with the control chamber 175a of the nozzle portion 175 via a communication passage 174c.

The control valve 174a is configured to be movable integrally with the second piston 173b of the drive power transmission portion 173. The valve chamber 174b is provided with a low-pressure side seat surface 174d and a high-pressure side seat surface 174e on which the control valve 174a is selectively seated.

A communication port communicating with the low pressure passage 171b is open in the low-pressure side seat surface 174d. A communication port communicating with the high pressure passage 171a via the communication passage 175f of the nozzle portion 175 is open in the high-pressure side seat surface 174e. A spring 174f is disposed to cause the control valve 174a to be biased toward the second piston 173b of the drive power transmission portion 173 so that the control valve 174a contacts the second piston 173b.

When the piezo actuator 172 extends or contracts, the first and second pistons 173a, 173b of the drive power transmission portion 173 and the control valve 174a of the control valve portion 174 displace in the axial direction X, so that the control valve 174a can be selectively seated on the low-pressure side seat surface 174d or the high-pressure side seat surface 174e. Thus, the pressure in the control chamber 175a of the nozzle portion 175 can be increased or decreased.

The nozzle portion 175 includes a nozzle needle 175b extending in the axial direction X, a cylinder member 175c arranged at an outer peripheral side of the nozzle needle 175b, and a needle spring 175d causing the nozzle needle 175b to be biased to a side of the injection holes 17b.

The control chamber 175a of the nozzle portion 175 is defined by using an end surface of the nozzle needle 175b on a side of the valve chamber 174b and an end surface of the cylinder member 175c. The control chamber 175a is made to generally communicate with the valve chamber 174b of the control valve 174, so as to generate a back pressure to the nozzle needle 175b. The back pressure of the control chamber 175a is adapted to cause the nozzle needle 175b to be biased in a valve-close direction together with the needle spring 175d.

An oil storage chamber 175e, communicating with the high pressure passage 171a and the injection holes 17b, is provided at an outer peripheral side of the nozzle needle 175b and the cylinder member 175c. The oil storage chamber 175e communicates with a communication port of the high-pressure side seat surface 174e of the control valve portion 174 via a communication passage 175f. The oil storage chamber 175e is provided such that the pressure of the high-pressure fuel of the oil storage chamber 175e causes the nozzle needle 175b to be biased in a valve-open direction.

FIG. 2 shows a non-injection state of the injector 17. In the non-injection state of the injector 17, the nozzle needle 175b can be seated by the back pressure of the control chamber 175a and the biasing force of the needle spring 175d. Therefore, a fuel supply from the oil storage chamber 175e to the injection holes 17b is shut.

In contrast, in an injection state of the injector 17, the piezo actuator 172 is extended, and thereby the pressure of the control chamber 175a of the control valve portion 174 is reduced. Thus, the nozzle needle 175b moves upwardly against to the biasing force of the needle spring 175d of the nozzle needle 175b, so that the fuel stored in the oil storage chamber 175 is injected from the injection holes 17b.

The connection member 176 of the injector 17 is formed into approximately a cylindrical shape extending in the axial direction X, and is made of a stainless or a carbon steel. One end portion (e.g., a lower end portion) of the connection member 176 is fixed to the injector body 171 at a position where the fuel flow-out port 17c is formed. The connection member 176 and the injector body 171 can be fixed by screwing, fitting, resinous bonding, a melting or the like.

A fuel passage 176a communicating with the fuel flow-out port 17c of the injector body 171 is provided within the connection member 176. The connection member 176 includes a large outer diameter portion 176b on a side of the injector body 171 (e.g., the lower side in FIG. 2), and a small outer diameter portion 176c on a side opposite to the injector body 171 (e.g., the lower side in FIG. 2).

Thus, as shown in FIG. 2, a step surface 176d is formed at a boundary between the large outer diameter portion 176b and the small outer diameter portion 176c. A tilt surface 176e is provided on the large outer diameter portion 176b at a position close to the injector body 171. The tilt surface 176e of the connection member 176 is configured such that the outer diameter of the tilt surface 176e is reduced as toward the injector body 171.

A tip portion 176f of the small outer diameter portion 176c is formed into a round shape by an orifice throttling. Therefore, the tip portion 176f of the small outer diameter portion 176c is adapted as a throttle portion.

Figure 3A:
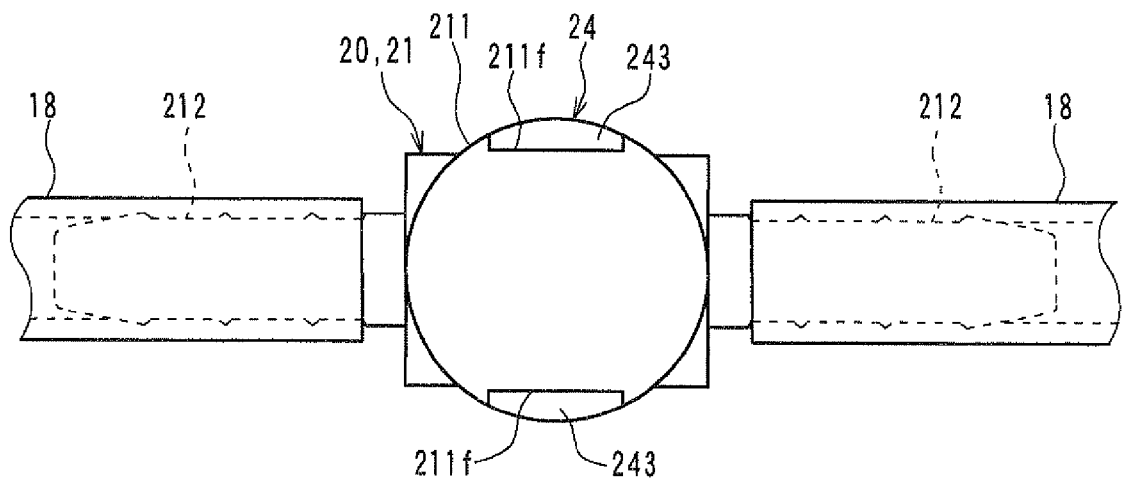
FIG. 3A is a top view showing a connection structure between a connection member of the injector and a low-pressure fuel pipe.
Figure 3B:
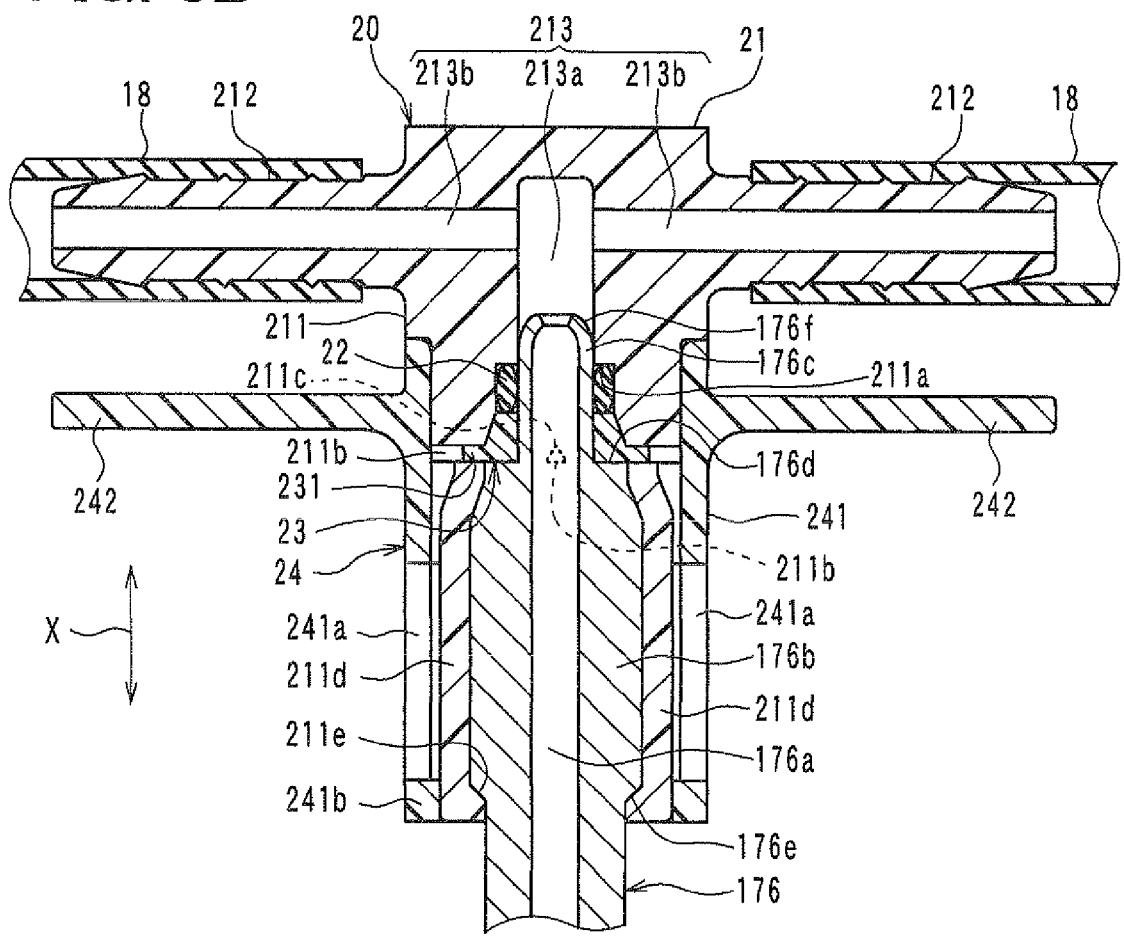
FIG. 3B is a cross-sectional view of the connection structure of FIG. 3A, according to the first embodiment.

FIG. 3A is a top view showing a connection structure between the connection member 176 and the low pressure fuel pipe 18, and FIG. 3B is a cross-sectional view of the connection structure between the connection member 176 and the low pressure fuel pipe 18.

The connector 20 includes a body portion 21 connected to the connection member 176 and the low pressure fuel pipe 18, a circular O-ring 22 for sealing between the body portion 21 and the connection member 176, and a circular O-ring holding member 23 for holding the O-ring 22 in the body portion 21.

The body portion 21 is molded integrally by using a resin such as polyamide (PA), polyphenylene sulfide (PPS), polyphtalamide (PPA) or the like. The body portion 21 is provided with a first connection portion 211 connected to the connection member 176, and a second connection portion 212 connected to the low pressure fuel pipe 18. The first connection portion 211 is provided to extend in a direction parallel with the axial direction X, and the second connection portion 212 is provided to extend in a direction perpendicular to the axial direction X.

Figure 4:
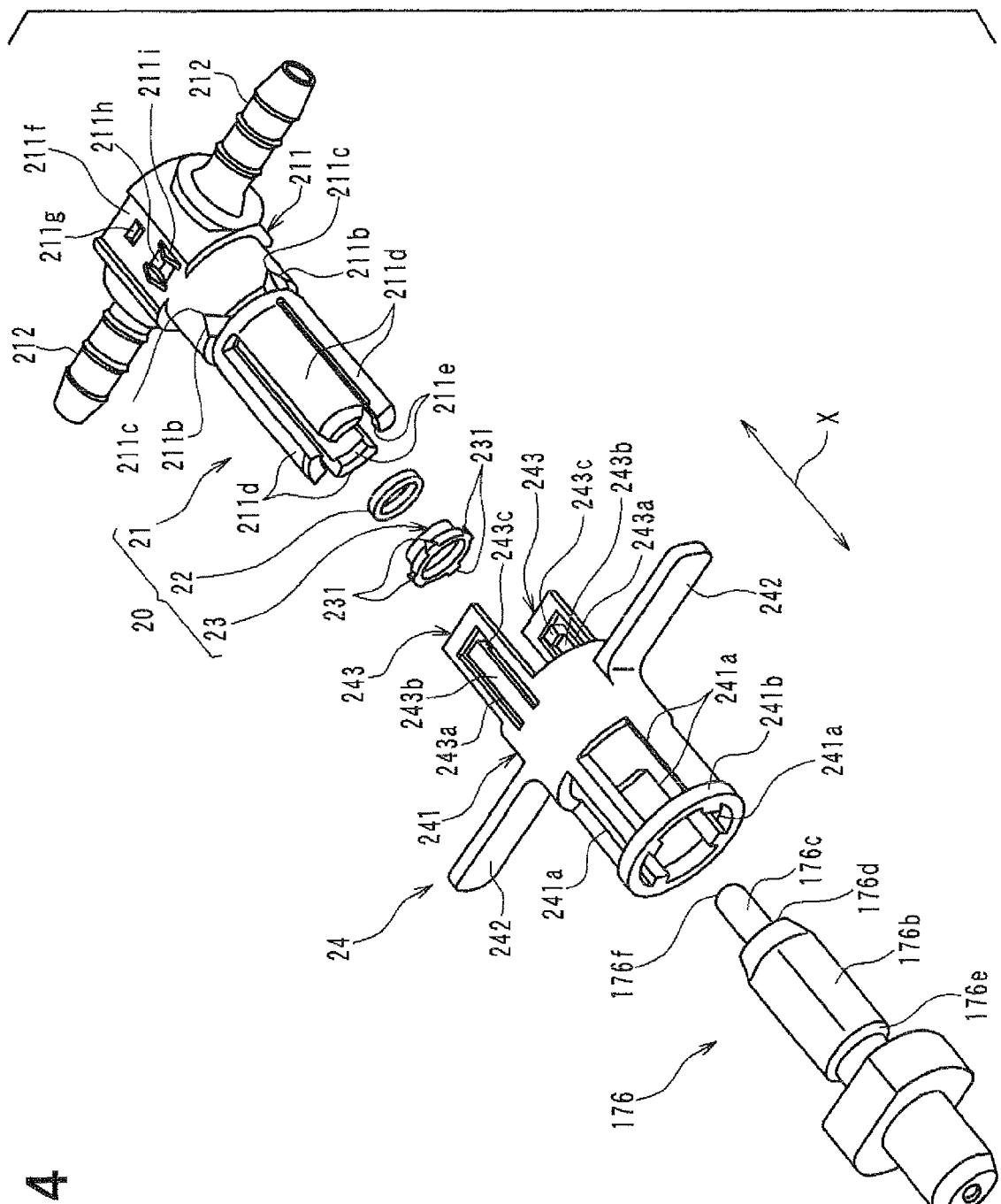
FIG. 4 is a disassembled perspective view showing the connection structure of FIGS. 3A and 3B.

As shown in FIGS. 3A, 3B and 4, because two low pressure fuel pipes 18 are connected to the body portion 21, two second connection portions 212 are provided in the body portion 21 to correspond to the two low pressure fuel pipes 18. The two second connection portions 212 extend from an end portion of the first connection portion 211 to be opposite to each other, so that the body portion 21 is formed into approximately a T-shape, as shown in FIG. 3B.

An approximately T-shaped through hole 213 is provided within the body portion 21 to communicate with the fuel passage 176a of the connection member 176 and each low pressure fuel pipe 18. For example, the through hole 213 is configured by a cylindrical first hole portion 213a extending in a direction parallel to the axial direction within the first connection portion 211, and two cylindrical second hole portions 213b provided in the two second connection portions 212 to extend in direction perpendicular to the axial direction X.

In the example of FIG. 3B, a rubber hose may be used as the low pressure fuel pipe 18. The two second connection portions 212 are respectively inserted into the two low pressure fuel pipes 18, to be connected to the two low pressure fuel pipes 18, respectively.

As shown in FIG. 1, the rightmost connector 20 among the four connectors 20 is connected to only one low pressure fuel pipe 18. In this case, only one second connection portion 212 is provided in the body portion 21. For example, when the second connection portion 212 extends in a direction perpendicular to the axial direction X, the body portion 21 is formed approximately into a L-shape entirely. Alternatively, when the second connection portion 212 extends in a direction parallel with the axial direction X, the body portion 21 is formed approximately into a I-shape entirely. That is, the one second connection portion 212 may be provided in the body portion 21 to extend in a direction substantially perpendicular to the axial direction X or a direction parallel to the axial direction X or a direction bent from the axial direction X, without being limited to the two second connection portions 212 shown in FIG. 3B.

As shown in FIG. 3B, the small outer diameter portion 176c of the connection member 176 is inserted into the first hole portion 213a of the through hole 213. Therefore, the first hole portion 213a of the through hole 213 is adapted as an insertion hole into which the connection member 176 is inserted.

A step portion 211a is provided in an inner peripheral surface of the first connection portion 211 defining the first hole portion 213a, so that the radial dimension of the first hole portion 213a is enlarged by the step portion 211a at an insertion side (e.g., lower side in FIG. 3B) of the connection member 176.

The O-ring holding portion 23 is engaged with the step portion 211a to define a groove portion, and the O-ring 22 is disposed in the groove portion. The O-ring holding portion 23 is arranged at the insertion inlet side of the first hole portion 213a, than the position of the O-ring 22. The O-ring 22 is adapted to liquid-tightly seal a clearance between the inner peripheral surface of the body portion 21 defining the first hole portion 213a, and an outer peripheral surface of the small outer diameter portion 176c of the connection member 176.

Figure 5A:
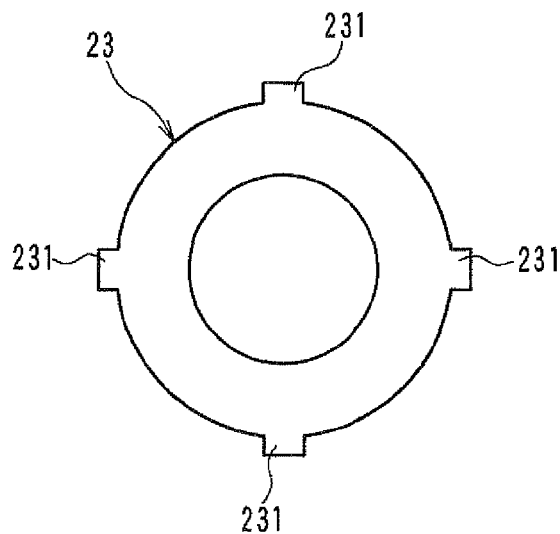
FIGS. 5A and 5B are front view and side view, respectively, showing an O-ring holding member in the connection structure of FIGS. 3A and 3B.
Figure 5B:
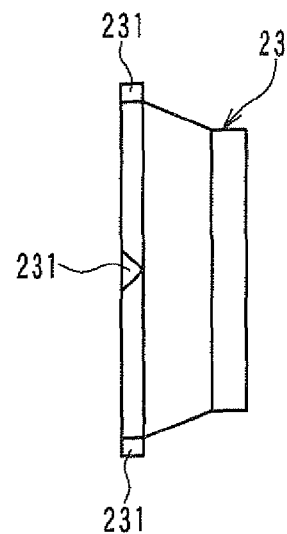

FIGS. 5A and 5B are top view and side view showing the O-ring holding member 23. The O-ring holding member 23 is molded integrally by using a resin. Plural protrusion portions 231 (e.g., four protrusion portions in FIGS. 5A and 5B) protruding radially outwardly are provided at plural positions on an outer peripheral portion of the O-ring holding member 23.

As shown in FIG. 4, plural recess portions 211b are opened in the body portion 21 from the peripheral surface of the first hole portion 213a to radially outside, at positions where the protrusion portions 211b of the O-ring holding portion 23 are provided. The recess portions 211b provided at the insertion inlet side of the first insertion hole 213a, than a position where the O-ring 22 is provided.

The plural recess portions 211b are arranged to respectively correspond to protrusion portions 231 of the O-ring holding members 23. By respectively engaging the recess portions 211b with the protrusion portions 231, the O-ring holding member 23 is held by and supported to the body portion 21. In the present embodiment, because the recess portion 211b is configured by a through hole radially penetrating through the body portion 21, the recess portion 211b does not become in an undercut shape in molding. Therefore, by using a slide core (not shown) in the molding, the recess portion 211b can be molded.

As shown in FIG. 3B, the recess portion 211b extends in a direction parallel to the axial direction X, such that an end portion 211c of the recess portion 211b on a side of an arrangement position of the O-ring 22 becomes in an acute angle shape which is acute as toward the arrangement position of the O-ring 22. In the example of FIG. 3B, the recess portion 211b is formed into a polyangular shape (e.g., three angular shape) having plural tops. Among the plural tops of the polyangular shape, one top of the polyangular shape of the recess portion 211b configures the end portion 211c of the recess portion 211b.

Because the end portion 211c of the recess portion 211b has an angular shape, a width dimension of the recess portion 211b in a circumferential direction of the first hole portion 213a becomes gradually smaller as toward the arrangement position of the O-ring 22.

The end portion 211c of the recess portion 211b is unnecessary to be a strict angular shape. For example, the end portion 211c of the recess portion 211b may be approximately an angular shape in the entire shape. The end portion 211c of the recess portion 211b may be an angular shape with a slightly round part generated in molding.

A plurality of protrusion pieces 211d are provided in the first connection portion 211 of the body portion 21. The protrusion pieces 211d are provided to extend from a peripheral portion of an insertion inlet port of the first hole portion 213a toward a side of the connection member 176 in the axial direction X. In the example of FIG. 3B, four protrusion pieces 211d are provided to extend toward the connection member 176 (e.g., lower side in FIG. 3B). Each of the protrusion pieces 211d has a circular arc shape in a cross section that is perpendicular to the axial direction X.

A claw portion 211e is provided at a protrusion tip end of each protrusion piece 211d to be engaged with a tilt surface 176e of the connection member 176. The claw portions 211e of the protrusion pieces 211d of the body portion 21 are respectively engaged with the tilt surface 176e of the connection member 176, thereby preventing the connection member 176 from being removed from the connector 20.

A connector cover 24 is disposed to cover the connector 20. The connector cover 24 is disposed to be slidable in the axial direction X so as to be switched between a release state and a lock state. In the release state of the connector cover 24, a connection between the connector 20 and the connection member 176 is released. In contrast, in the lock state of the connector cover 24, a connection between the connector 20 and the connection member 176 is maintained and is locked.

Figure 6A:
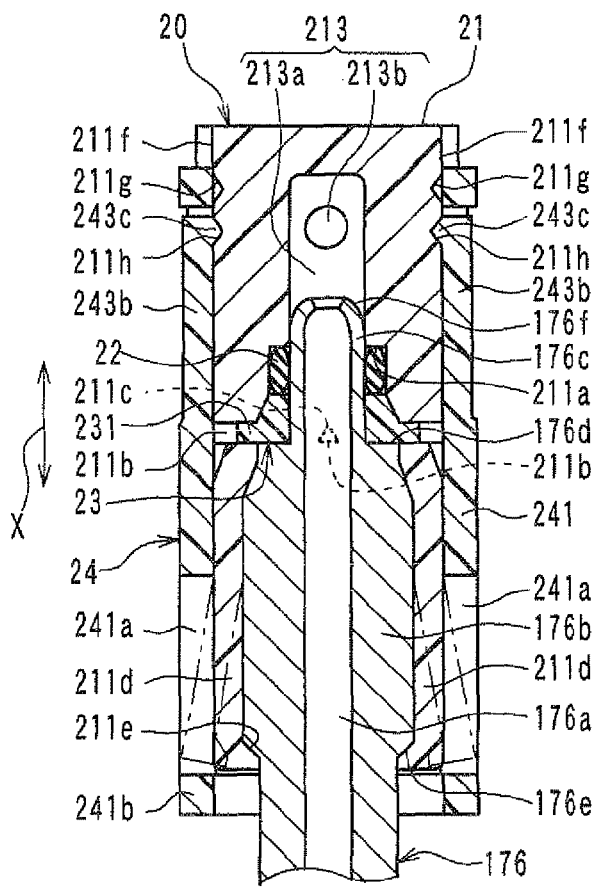
FIG. 6A is a cross-sectional view showing a release state of the connection structure in FIGS. 3A and 3B.
Figure 6B:
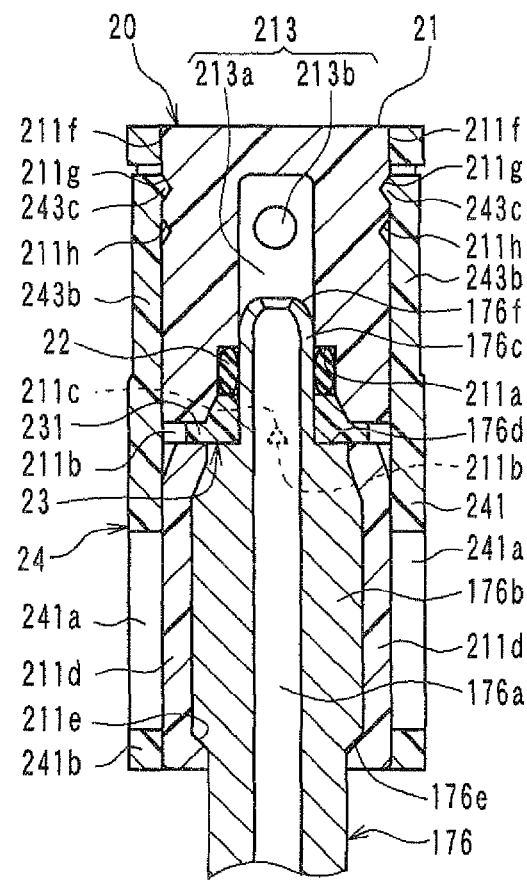
FIG. 6B is a cross-sectional view showing a lock state of the connection structure in FIGS. 3A and 3B.

For example, when the connector cover 24 is moved to a release position on a side opposite to the body portion 21 in the axial direction X as shown in FIG. 6A, the connection between the connector 20 and the connection member 176 is released. In contrast, when the connector cover 24 is moved to a lock position on a side of the body portion 21 in the axial direction X as shown in FIG. 6B, the connection between the connector 20 and the connection member 176 is locked.

As shown in FIG. 4, the connector cover 24 includes a cylindrical portion 241 extending in the axial direction X, two finger portions 242 protruding radially outside from an outer peripheral surface of the cylindrical portion 241, and two plate portions 243 protruding from an axial end of the cylindrical portion 241 to one side in the axial direction X. The connection cover 24 including the cylindrical portion 241, the two finger portion 242 and the two plate portions 243 are molded integrally by using a resin.

The two finger portions 242 protrude from an outer peripheral surface of the cylindrical portion 241 to opposite sides in a radial direction. When a user moves the connector cover 24 in the axial direction X, the user can hold the finger portions 242 by the fingers. Thus, the moving operation of the connector cover 24, including the switching operation between the release state and the lock state, can be easily performed.

The other end portion of the outer peripheral surface of the cylindrical portion 241 in the axial direction X is provided with plural rectangular opening portions 241a. The opening portions 241a are provided at plural positions respectively corresponding to the protrusion pieces 211d of the connector 20. In the example of FIG. 4, four opening portions 241a are provided. A circular portion 241b is provided at a tip end of the cylindrical portion 241 on a side adjacent to the opening portions 241a.

As shown in FIGS. 3A and 4, each of the plate portions 243 is provided to be received in a concave portion 211f provided on the outer surface of the first connection portion 211 of the connector 20. As shown in FIG. 4, a U-shape through groove 243a is formed in each plate portion 243, so as to form an elastic piece 243b formed by the U-shape through groove 243a. Therefore, the elastic piece 243b extends from one end portion of the cylindrical portion 241 to be deformable in the thickness direction (i.e., radial direction of the cylindrical portion 241).

A claw portion 243c is provided at a tip end of the elastic piece 243b to protrude radially inside of the elastic piece 243b. Furthermore, a first recess portion 211g and a second recess portion 211h are provided in the concave portion 211f, so that the claw portion 243c of the elastic piece 243b is capable of engaging with the first recess portion 211g or the second recess portion 211h.

When the connector cover 24 is moved to the release position shown in FIG. 6A, the claw portion 243c of each elastic piece 243b is engaged with the second recess portion 211h. At the release position of the connector cover 24, the opening portions 241a of the connector 24 are respectively fitted with the protrusion pieces 211d, but the circular portion 241b of the connector cover 24 is not fitted with the protrusion pieces 211d of the connector 20.

When the connector cover 24 is moved to the lock position shown in FIG. 6B, the claw portion 243c of each elastic piece 243b is engaged with the first recess portion 211g. At the lock position of the connector cover 24, the opening portions 241a of the connector 24 are respectively fitted with the protrusion pieces 211d, and the circular portion 241b of the connector cover 24 is fitted with the protrusion pieces 211d of the connector 20. That is, the circular portion 241b of the connector cover 24 is fitted with the claw portions 211e of the protrusion pieces 211d of the connector 20.

Protrusion portions 211i are provided in the concave portion 211f of the connector 20, to be inserted into the through groove 243a. Because the protrusion portions 211i are slidably inserted into the through groove 243a of the connector cover 24, the movement of the connector cover 24 in the axial direction X can be guided.

Next, connection steps of the injector 17 and the low pressure fuel pipe 18 will be described.

First, the second connection portion 212 of the connector 20 is inserted into the end portion of the low pressure fuel pipe 18, so that the connector 20 and the low pressure fuel pipe 18 are connected to each other.

Next, the connector cover 24 is connected to the connector 20 to be located at the release position shown in FIG. 6A, and then the connection member 176 of the injector 17 is inserted into the first hole portion 213a as the insertion hole. At this time, the claw portions 211e of the protrusion pieces 211d of the connector 20 are located at positions interfering with the large outer diameter portion 176b of the connection member 176.

However, as in the chain line in FIG. 6A, because the protrusion pieces 211d of the connector 20 can be press-expanded from a side of the large outer diameter portion 176b of the connection member 176 toward the opening portions 241a of the connection cover 24, it is possible to insert the connection member 176 into the first hole portion 213a as the insertion hole.

In the present embodiment, the tip portion 176f of the small outer diameter portion 176c of the connection member 176 of the injector 17 is formed into the round shape by the orifice throttling. Thus, when the connection member 176 is inserted into the first hole portion 213a having the O-ring 22, it can prevent a damage of the O-ring 22 even when the small outer diameter portion 176c passes through the arrangement portion of the O-ring 22 in the first hole portion 231a as the insertion hole.

The connection member 176 is further inserted into the first hole portion 213a of the connector 20, so that the step surface 176d of the connection member 176 contacts the recess portion 211b of the connector 20. Then, the connector cover 24 is moved from the release position in FIG. 6A to the lock position in FIG. 6B, so that the circular portion 241b of the connector cover 24 is fitted with the claw portions 211e of the protrusion pieces 211d of the connector 20.

At the lock position shown in FIG. 6B, because the claw portions 211e of the protrusion pieces 211d of the connector 20 are engaged with the tilt surface 176e of the connection member 176 while it can prevent the protrusion pieces 211d of the connector 20 from being elastically deformed, the connection member 176 is not removed from the connector 20 so that the connection member 176 and the connector 20 becomes in the lock state.

With the above steps, the connection between the connection member 176 of the injector 17 and the connector 20 is ended, thereby finishing the connection between the injector 17 and the low pressure fuel pipe 18.

When the connection member 176 of the injector 17 and the low pressure fuel pipe 18 are disassembled, the connector cover 24 is moved from the lock position to the release position, and then the connection member 176 is removed and separated from the connector 20.

At the connection state of the injector 17 and the low pressure fuel pipe 18, the low-pressure fuel flowing out from the fuel flow-out port 17c of the injector 17 flows into the low pressure fuel pipe 18 through the fuel passage 176a of the connection member 176 and the through hole 213 within the connector 20.

Because the throttle portion is provided at the tip portion 176f of connection member 176, the peak pressure in the pressure pulse of the fuel can be reduced.

In the present embodiment, the throttle portion for reducing the peak pressure in the pressure pulse of the fuel is provided in the connection member 176 of the injector 17, and thereby it is unnecessary to additionally provide a special throttle mechanism in the fuel injection device 10. Thus, components number can be reduced in the fuel injection device 10, thereby reducing the cost.

Next, assemble of the connector 20 will be described. First, the O-ring 22 is inserted into the first hole portion 213a of the body portion 21, and then the O-ring holding member 23 is inserted into the first hole portion 213a of the body portion 21. The protrusion portions 231 of the O-ring holding member 23 are engaged with the recess portions 211b of the body portion 21, respectively, so that the O-ring holding member 23 is fixed to the body portion 21, thereby finishing the assemble of the connector 20.

The recess portions 211b are open in the inner peripheral surface defining the first hole portion 213a of the body portion 21. Thus, when the O-ring 22 is inserted into the first hole portion 213a, a part of the O-ring 22 may be inserted into the recess portion 211b.

In the present embodiment, the recess portion 211b is formed into a polyangular shape such that the width dimension of the end portion 211c of the recess portion 211b becomes gradually smaller toward the arrangement position of the O-ring 22. Thus, while the O-ring 22 passes the end portion 211c of the recess portion 211b, the inserted part of the O-ring 22 is gradually removed from the recess portion 211b, thereby preventing the O-ring 22 from being scratched by the recess portion 211b.

If the recess portion 211b is formed into a circular shape, the O-ring 22 may be difficult to be removed from the recess portion 211b while passing the recess portion 211 in the first hole portion 213a of the body portion 21. That is, in this case, because the end portion of the recess portion 211b becomes in a circular arc, the width dimension of the recess portion 211b becomes greatly small, and thereby it may be difficult to smoothly remove the O-ring 22 from the recess portion 211b.

In contrast, in the present embodiment, because the width dimension of the end portion 211c of the recess portion 211b is gradually reduced toward the arrangement position of the O-ring 22, the O-ring 22 can be smoothly removed from the recess portion 211b while being inserted into the first hole portion 213a.

Accordingly, scratch of the O-ring 22 can be prevented without chamfering the O-ring 22.

Second Embodiment

In the above-described first embodiment, the end portion 211c of the recess portion 211b is made in the angular shape so as to prevent scratch of the O-ring 22. However, in a second embodiment, as shown in FIG. 7, an angle reducing portion 211m is provided in the recess portion 211b so as to prevent a scratch of the O-ring 22.

Figure 7:
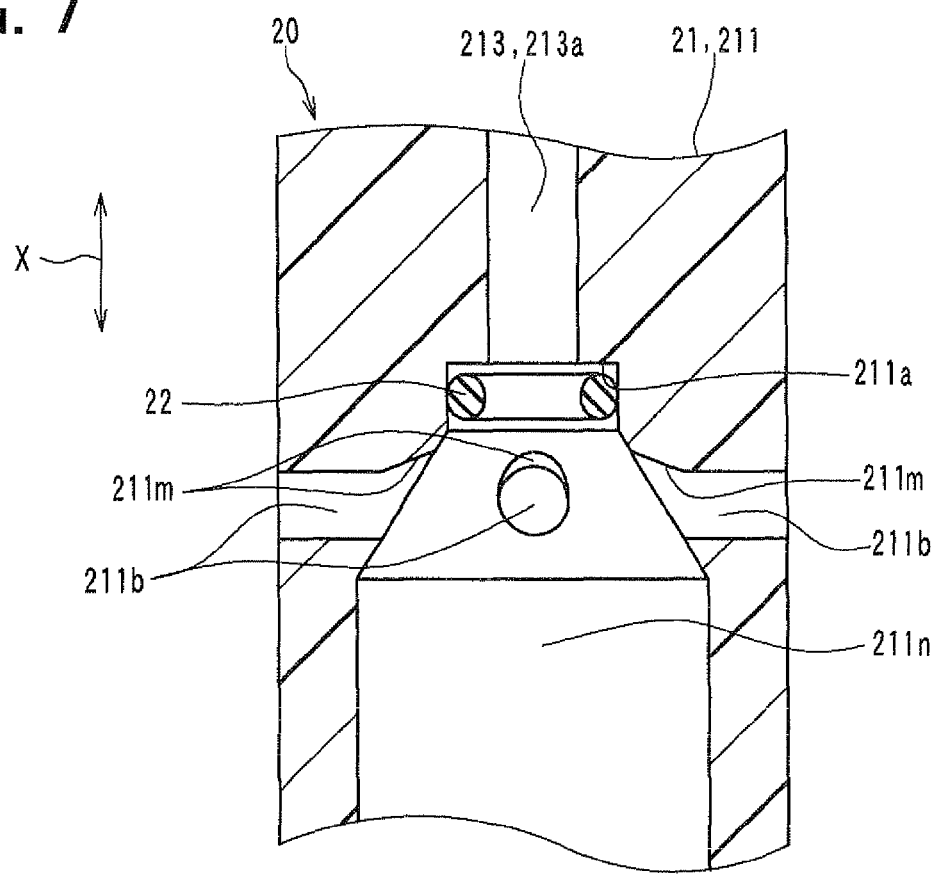
FIG. 7 is a schematic cross-sectional view showing a connector according to a second embodiment of the present invention.
Figure 8:
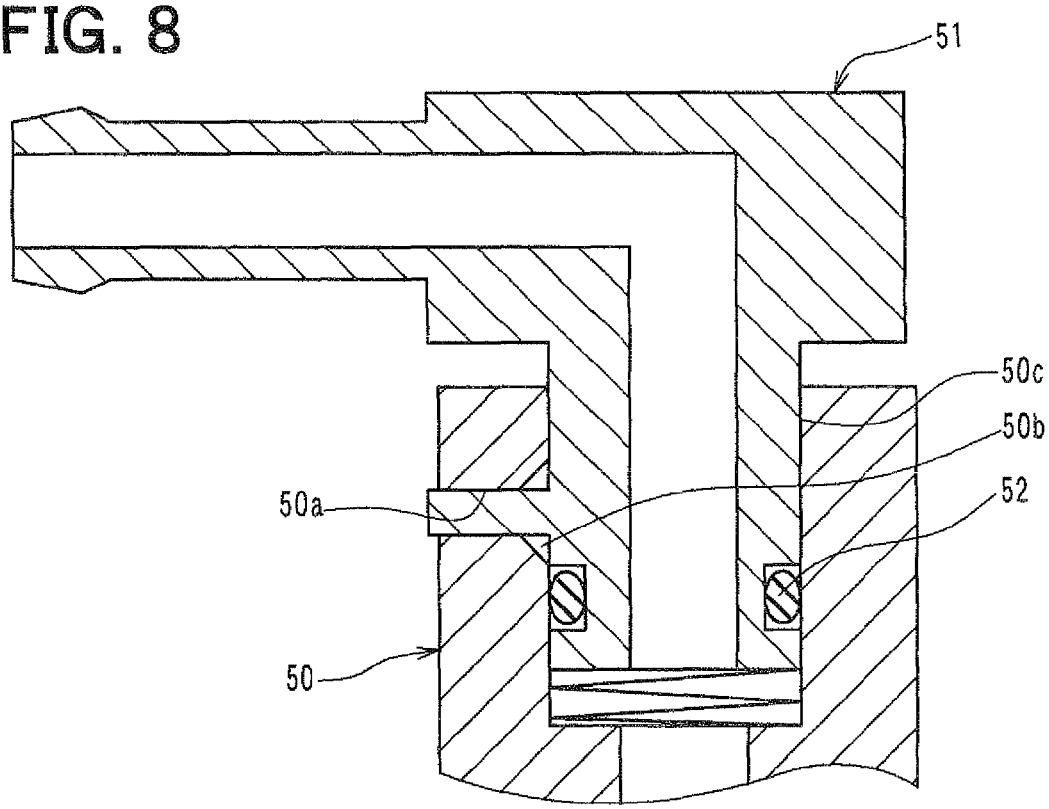
FIG. 8 is a cross-sectional view showing a connection structure of a connector and a connection member in an example studied by the inventors of the present application.

FIG. 7 is a schematic sectional view showing a connector 20 of the present embodiment. In FIG. 7, the O-ring holding member 23 is not indicated.

In the present embodiment, the recess portion 211b is formed into a circular shape to be opened in the body portion 21 in a radial direction. An angle reducing portion 211m is provided in the inner peripheral surface of the body portion 21 defining the first hole portion 213a, at an end portion of the recess portion 211b, on an arrangement side of the O-ring 22. In the example of FIG. 7, the angle reducing portion 211m is chamfered on the arrangement side of the O-ring 22. However, the angle reducing portion 211m may be formed into a round shape.

Furthermore, as shown in FIG. 7, an enlarged cylindrical portion 211n is provided at an insertion inlet side in the first hole portion 213a of the body portion 21 to be enlarged radially outside more than the outer position of the angle reducing portion 211m. In the example of FIG. 7, a part of the inner peripheral surface of the body portion 21, defining the first hole portion 213a, is formed into a taper shape, and the recess portion 211b and the angle reducing portion 211m are provided in the taper-shaped part in the inner peripheral surface of the body portion 21. However, it is unnecessary to provide the taper-shaped part in the first hole portion 213a, and the first hole portion 213a may be enlarged at the insertion inlet side in a step shape.

According to the present embodiment, the angle reducing portion 211m is provided in the recess portion 211b at an end portion on the arrangement side of the O-ring 22 (i.e., the upper side of the recess portion 211b in FIG. 7), thereby preventing scratch of the O-ring 22 by the recess portion 211b. Because the angle reducing portion 211m is provided, even when the O-ring 22 is inserted into the recess portion 211b while passing through the recess portion 211b in the first hole portion 213a, the inserted part of the O-ring 22 can be gradually removed while passing through the angle reducing portion 211m. Thus, the O-ring 22 can be smoothly removed and separated from the recess portion 211b in the inserting, thereby preventing the O-ring 22 from being scratched by the recess portion 211b.

Furthermore, the enlarged cylindrical portion 211n is provided in the first hole portion 213a at the insertion inlet side from the recess portion 211b, and is enlarged radially outside more than the angle reducing portion 211m. Therefore, it can prevent the angle reducing portion 211m from being an undercut shape in the molding.

That is, as shown in FIG. 7, a die for molding the angle reducing portion 211m can be easily removed from the insertion inlet side of the first hole portion 213a, thereby preventing the angle reducing portion 211m from being an undercut shape in the molding.

Accordingly, in the present embodiment, it can prevent scratch of the O-ring 22 without generating an undercut shape in a molding.

Other Embodiments

Although the present invention has been fully described in connection with the preferred embodiments thereof with reference to the accompanying drawings, it is to be noted that various changes and modifications will become apparent to those skilled in the art.

For example, in the above embodiments, by engaging the recess portion 211b with the protrusion portions 231 of the O-ring holding member 23, the O-ring holding member 23 is held by and supported to the body portion 21. The configuration of the recess portion 211b is not limited to the above, and may be suitably changed.

The recess portion 211b may be provided as a fuel passage part communicating with the first hole portion 213a, and may be provided to be engaged with a protrusion portion of the connection member 176.

In the above embodiments, the end portion of the second connection portion 212 is inserted into the low pressure fuel pipe 18, so that the low pressure fuel pipe 18 is connected to the second connection portion 212. However, the end portion of the low pressure fuel pipe 18 may be inserted into the second connection portion 212 so as to connect the low pressure fuel pipe 18 and the second connection portion 212, similarly to the connection between the connection member 176 and the first connection portion 211.

In the above-described embodiments, the O-ring 22 is attached into the connector 20, and the connection member 176 is inserted into the first hole portion 213a of the connector 20. However, the O-ring 22 may be attached to the connection member 176 before the connection member 176 is inserted into the first hole portion 213a of the connector 20. For example, the O-ring 22 and the O-ring holding member 23 are fitted onto the outer peripheral surface of the connection member 176 at first, and then the connection member 176 is inserted into the first hole portion 213a of the connector 20 together with the O-ring 22 and the O-ring holding member 23.

In the above-described embodiments, the connector 20 of the present invention is typically applied to the connection between an injector and a low pressure fuel pipe in a fuel injection device. However, the connector 20 of the present invention can be applied to any connection structure in which the connector 20 is connected to a connection member for a fluid flow.

Such changes and modifications are to be understood as being within the scope of the present invention as defined by the appended claims.

What is claimed is:

1. A connector to be connected to a connection member in which a fluid flows, and to be sealed by using an O-ring between the connector and a cylindrical outer peripheral surface of the connection member, the connector comprising:
   a body portion having an inner peripheral surface defining a cylindrical insertion hole for inserting therein the connection member and the O-ring, the cylindrical insertion hole being provided with an arrangement position of the O-ring; and
   a recess portion provided in the inner peripheral surface of the body portion and opened in the body portion in a radial direction of the body portion, at a position on an inlet side of the insertion hole relative the arrangement position of the O-ring, wherein
   the recess portion extends in an axial direction of the body portion and has an end portion on a side of the arrangement position of the O-ring, and
   the end portion of the recess portion becomes in an acute angle shape which is acute toward the arrangement position of the O-ring.

2. The connector according to claim 1, wherein
   the recess portion is a polyangular shape having plural tops, and
   the end portion of the recess portion is one of the tops in the polyangular shape.

3. A connector to be connected to a connection member in which a fluid flows, and to be sealed by using an O-ring between the connector and a cylindrical outer peripheral surface of the connection member, the connector comprising:
   a body portion having an inner peripheral surface defining a cylindrical insertion hole for inserting therein the connection member and the O-ring, the cylindrical insertion hole being provided with an arrangement position of the O-ring; and
   a recess portion provided in the inner peripheral surface of the body portion and opened in the body portion in a radial direction of the body portion, at a position on an inlet side of the insertion hole relative the arrangement position of the O-ring; and
   an angle reducing portion in which an angle of the recess portion is reduced, the angle reducing portion being provided at an end portion of the recess portion on a side of the arrangement position of the O-ring, wherein
   the insertion hole is enlarged at an inlet side of the recess portion more than a radial outer dimension of the angle reducing portion.

4. The connector according to claim 3, wherein
   the inner peripheral surface of the body portion has a taper portion in which the diameter of the insertion hole is enlarged as toward the inlet side of the insertion hole, and
   the recess portion is provided in the taper portion.

5. The connector according to claim 1 being adapted for connecting the connection member for discharging a low pressure fuel from an injector for a fuel injection, to a low pressure fuel pipe.

6. The connector according to claim 3 being adapted for connecting the connection member for discharging a low pressure fuel from an injector for a fuel injection, to a low pressure fuel pipe.

7. A connector structure comprising:
   a connector that includes a body portion having an inner peripheral surface defining a cylindrical insertion hole extending in an axial direction;
   a connection member in which a fluid flows, the connection member being inserted into the insertion hole;
   an O-ring arranged between the inner peripheral surface of the body portion and a cylindrical outer peripheral surface of the connection member, at an O-ring arrangement position in the insertion hole; and
   a recess portion provided in the inner peripheral surface of the body portion and opened in the body portion in a radial direction of the body portion, at a position on an inlet side of the insertion hole relative the O-ring arrangement position, wherein
   the recess portion extends in an axial direction of the body portion and has an end portion on a side of the O-ring arrangement position, and
   the end portion of the recess portion becomes in an acute angle shape which is acute toward the O-ring arrangement position.

8. The connector structure according to claim 7, further comprising
   an O-ring holding member for holding the O-ring,
   wherein the O-ring holding member includes a protrusion portion that is engaged with the recess portion.

* * * * *